Figure 1:
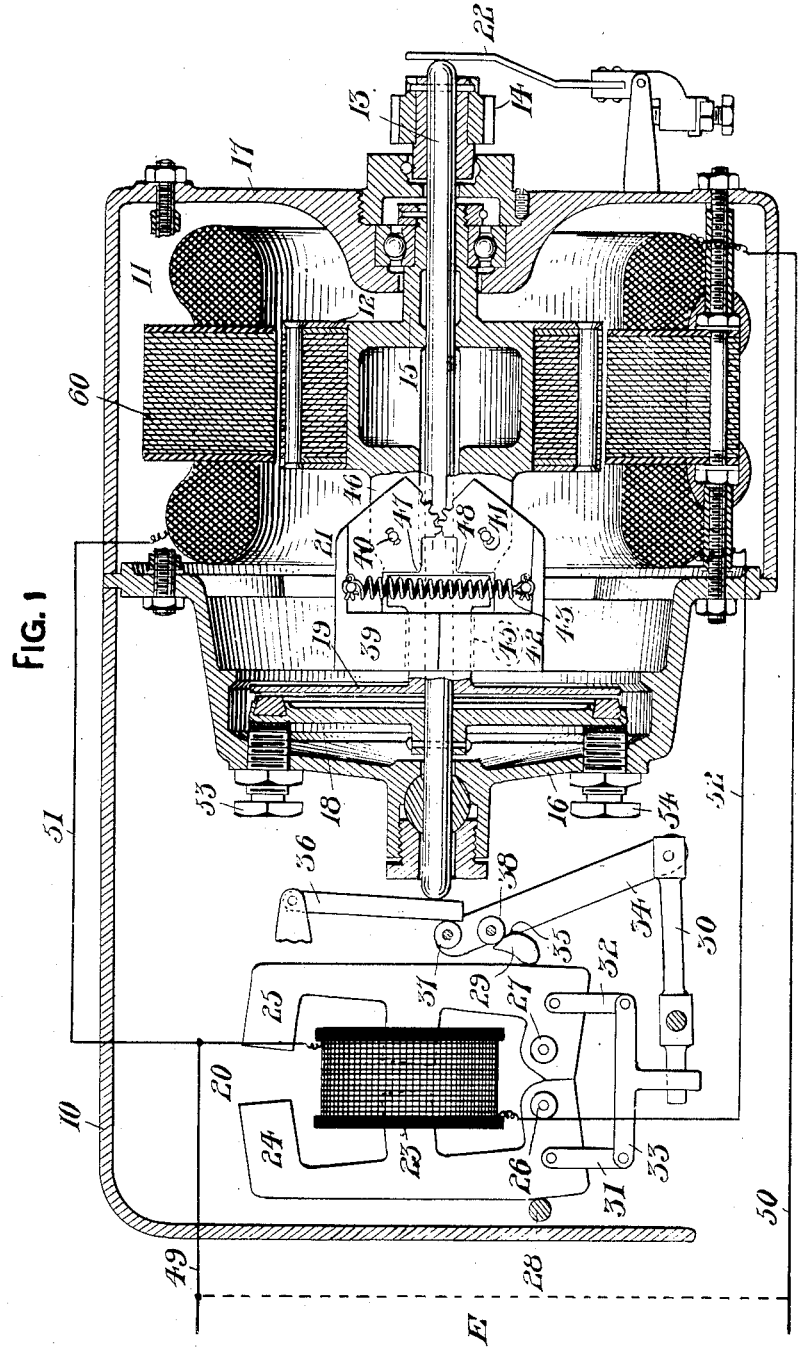

J. P. COLEMAN.
CLUTCH DEVICE.
APPLICATION FILED MAR. 8, 1912.

1,035,535.

Patented Aug. 13, 1912.
2 SHEETS—SHEET 1.

WITNESSES

INVENTOR
John P. Coleman
BY
ATTORNEY

J. P. COLEMAN.
CLUTCH DEVICE.
APPLICATION FILED MAR. 8, 1912.
1,035,535.
Patented Aug. 13, 1912.
2 SHEETS—SHEET 2.
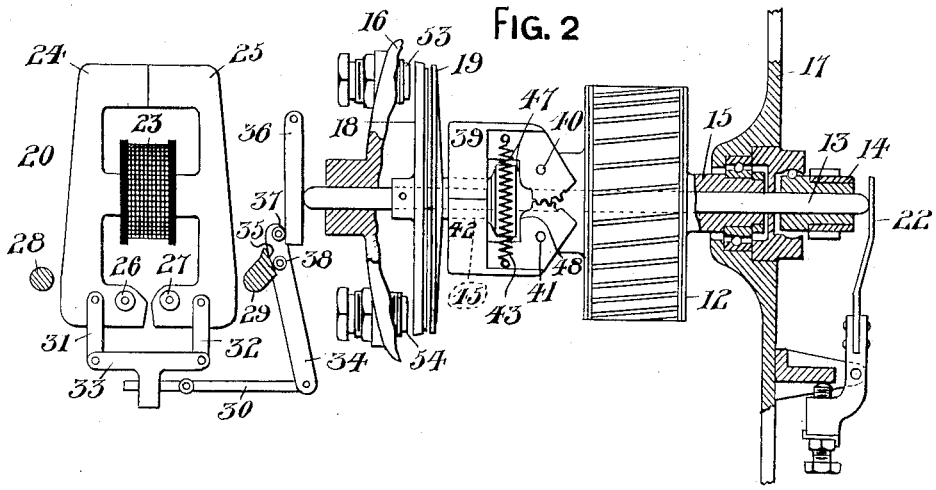
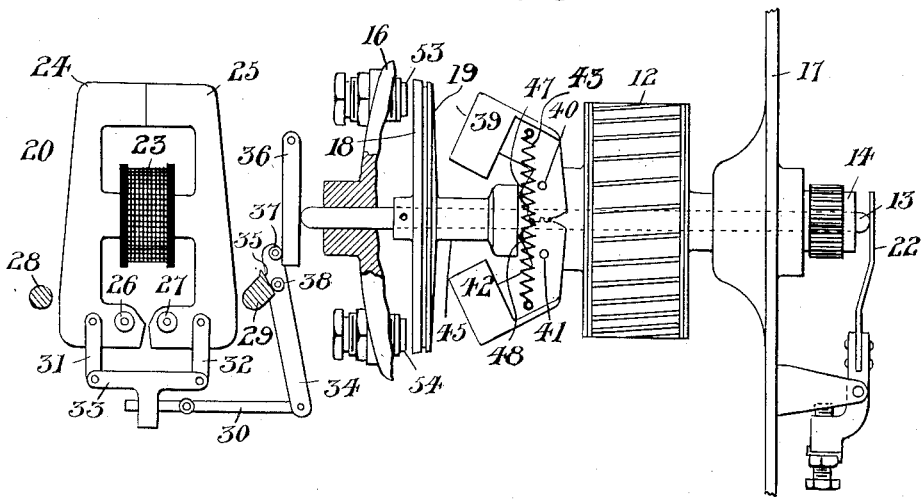
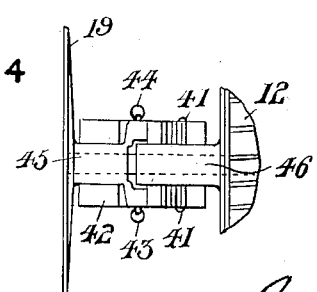
WITNESSES
INVENTOR
John P. Coleman
BY
ATTORNEY

UNITED STATES PATENT OFFICE.

JOHN P. COLEMAN, OF EDGEWOOD PARK, PENNSYLVANIA, ASSIGNOR TO THE UNION SWITCH & SIGNAL COMPANY, OF SWISSVALE, PENNSYLVANIA, A CORPORATION OF PENNSYLVANIA.

CLUTCH DEVICE.

1,035,535.  Specification of Letters Patent.  Patented Aug. 13, 1912.

Application filed March 8, 1912. Serial No. 682,376.

*To all whom it may concern:*

Be it known that I, JOHN P. COLEMAN, a citizen of the United States, residing at Edgewood Park, in the county of Allegheny and State of Pennsylvania, have invented certain new and useful Improvements in Clutch Devices, of which the following is a specification.

A clutch device embodying my invention is especially adapted for use in connection with electric motors having small starting torque, such for example as single phase induction motors, in which case it is desirable that upon starting, the motor should be allowed to run freely until it reaches full speed before it is connected with the load which it is to drive.

My invention provides a clutch device which, when the motor reaches full speed, acts instantly to connect the motor with its load and which acts to disconnect the motor from the load immediately upon the operating current being cut off from the motor.

I will describe one form of clutch device embodying my invention and will then point out the novel features thereof in claims.

In the accompanying drawings, Figure 1 is a view partly sectioned showing one form of clutch device embodying my invention, the parts being in the deënergized and disconnected positions. Fig. 2 is a view showing the clutch device shown in Fig. 1, but with the parts in the positions for engagement when the motor shall reach full speed. Fig. 3 is a view similar to the preceding views but showing the parts in engaging position and the motor running under load. Fig. 4 is a detail view of a portion of the centrifugal device shown in the preceding views.

Similar reference characters refer to similar parts throughout the several views.

One feature of my invention is the provision of two clutch disks, one of which revolves with the driving motor and the other with the load to be driven; these disks are each capable of relative longitudinal movement toward and away from the other, and these longitudinal movements are so limited that each must be moved toward the other in order that there may be operative engagement between the two.

Another feature of my invention is the provision of an electromagnetic device for moving one of the disks into and holding it in its engaging position, and of a centrifugal device operatively connected with the motor for moving the other disk into and holding it in its engaging position.

Still another feature of my invention is the provision of a centrifugal device which shall remain inoperative while the motor is starting, but which will act instantly to move its disk into engaging position when the motor reaches a predetermined speed— usually full speed.

Referring now to Fig. 1, 10 designates an inclosing casing in which is mounted an electric motor 11. This motor may be of any desired type, but a clutch device embodying my invention is particularly adapted for use in connection with a motor having a small starting torque, such for example as a single phase induction motor, which is the type of motor here illustrated. This motor comprises a stator 60, and a rotor 12 mounted upon a hub 15, which hub revolves freely on a shaft 13; the shaft 13 is mounted in two motor heads 16 and 17 to revolve freely and to have longitudinal movement the longitudinal movement being controlled by a spring 22 and by an electromagnetic device 20. This shaft carries a pinion 14 through which the motor drives its load.

18 and 19 are two concentric clutch disks. The disk 18 is rigidly secured to the shaft 13, here shown as being pinned thereto; the disk 19 is mounted upon a hub 45 which is freely mounted on shaft 13 and which, as hereinafter explained, is operatively connected with the rotor hub 15 in such manner as to have a small longitudinal movement thereto but to be constrained to rotate therewith. The adjacent faces of disks 18 and 19 are provided with a suitable material, such as leather, which produces a maximum amount of friction between the disks when they are held in engagement with each other, whereby the disk 19 is enabled to drive the disk 18 when the latter is connected with a load through the shaft and pinion. The disk 18 is controlled by the electro-magnetic device 20 in a manner hereinafter explained, and 21 designates a centrifugal device adapted to control the disk 19, also as hereinafter explained. Each of these devices, when operative, acts to move its disk toward the other disk, the movement of the disks being so limited that each must be moved toward the other by its controlling device to cause operative engagement of the two disks.

As before stated, the shaft 13 is movable longitudinally in its bearings. This shaft and its disk 18 are normally biased by a spring 22 to such position that the disk 18 is as far as possible away from disk 19. When however the motor is to be energized and connected with its load, this shaft is moved against the action of spring 22 so that its disk 18 approaches the disk 19. This latter movement may be caused in any suitable manner, preferably by an electromagnetic device 20 here shown as being of the type shown and described in United States Letters Patent No. 984,748 granted to me on February 21, 1911. It is understood however that I do not limit myself to this specific type of electromagnetic device. Briefly described, this device comprises two swinging armatures 24 and 25 pivotally mounted in the framework at points 26 and 27 respectively, which armatures are controlled by a winding 23. When the winding is deënergized the armatures fall apart by gravity so that they rest against two stops 28 and 29 respectively, as shown in Fig. 1; and when the winding is energized, the armatures are drawn toward each other into the positions shown in Fig. 2. These opposite or reverse movements of the armatures 24 and 25 are utilized to control the longitudinal movements of the shaft 13, through the medium of suitable links and connections interposed between the armatures and the shaft. A lever 30 is pivotally mounted on the framework. One end of the link is operatively connected with the armatures 23 and 24 by means of two depending links 31 and 32 and a cross-piece 33. The other end of the lever 30 is pinned to one end of a double link 34; only one side of this link is shown. The two sides of this link 34 are connected near the top by a pin 38 which rests against a face 35 of stop 29. It will be seen that when the armatures are drawn together, the link 34 will be pulled downwardly, and that when the armatures fall apart, the link 34 will be raised.

36 is a depending link which hangs against the end of shaft 13 as shown, and whose lower portion is in engagement with a pin 37 connecting the two sides of the link 34. The face 35 is slanted substantially as shown, so that the downward movement of link 34 forces the link 36 to the right, moving the shaft 13 to the right against the action of the spring 22. This movement places the disk 18 in position for engagement with disk 17 when the latter disk is also held in its engaging position. When the armatures 24 and 25 are permitted to fall apart, link 34 rises, permitting link 36 to swing outwardly, and thereby permitting the spring 22 to move shaft 13 back to its normal position.

I will now describe the centrifugal device 21 employed to control the disk 19. As here shown, this device comprises two weights 39 and 42 pivotally mounted upon a tongue 46 projecting from the hub of the rotor 12, the pivotal points being 40 and 41 respectively. In Fig. 4 I have shown a top view of this centrifugal device with the upper weight 39 omitted to show more clearly the details of the device. It will be seen that these weights are so mounted that when they lie close to the shaft 13, the radii through which they act is comparatively small, and that as they swing outwardly from the shaft the radii through which they act rapidly increases. These weights are biased to lie normally close to the shaft by means of two coiled springs 43 and 44, one on each side of the weights, the two ends of each spring being secured to the two weights respectively, as shown in the drawings. The disk 19 is mounted on a hub 45 which latter is loosely mounted upon the shaft 13. This hub is bifurcated at its outer end, as shown in Fig. 4, to receive the tongue 46. By means of this construction it will be seen that the disk 19 and its hub 45 are free to move a short distance longitudinally on the shaft 13, but that the disk is constrained by the tongue 46 to rotate with the rotor 12. The two weights are provided respectively with faces 47 and 48 adapted to engage with the ends of the bifurcated portion of the hub 45. These faces are so located that, as the weights move outwardly the faces will engage the hub 45 and move it and the disk 19 into the position for the engagement of that disk with disk 18. The two weights 39 and 42 are operatively connected one with the other by intermeshing teeth as shown, so that one weight cannot move without a corresponding movement of the other; hence the two weights balance each other and are unaffected by gravity in any position which they may occupy.

In the use of a motor having a small starting torque, such as the single phase induction motor, it is desirable that the motor should be allowed to reach its full speed while running freely, and that it should then be instantly and positively coupled with its load. The centrifugal device 21 meets these conditions by means of certain features of its construction which I will now explain. One feature of this device is that the springs 43 and 44 which act to hold the weights against the hub 45 exert their maximum influence when the weights are in this normal position; as the weights move outwardly under the influence of centrifugal force when a predetermined speed of the rotor is reached, the points of connection of the springs with the weights are being carried more nearly into coincidence with the straight line projected through the pivotal points of the weights, hence the springs although under increasing tension are actually diminishing in their effect upon the weights. That is, the effective radius through which the springs act upon the weights is shortened more rapidly than the tension of the springs increases. Hence, when at a predetermined speed of the rotor, the weights begin to move outward, they continue to move outward and with constantly increasing force, until restricted by the disk which they control coming into contact with the disk which is fixed to the motor shaft.

Another feature of the centrifugal device is that as the weights move outward under the influence of centrifugal force, their effective radius is constantly increasing. Hence it will be seen that two influences are coacting to produce effective pressure between the clutch disks the instant the rotor attains the speed which is necessary to cause the weights to start their outward movement. A greater velocity than this simply produces an excess of pressure between the disks over that which is necessary to drive one by the other. As an excess of pressure between the disks must be resisted by the electromagnetic device 20, it is preferable to so proportion the tension of the springs and the relations of their connections with the weights as to prevent the outward movement of the weights until the highest motor speed is reached that is obtainable under maximum load and minimum voltage. By this adjustment, excessive thrusts against the clutch members are avoided, and a minimum amount of electrical energy is required to operate the electromagnetic device 20.

A still further feature of the centrifugal device 21 is the location of the contact faces 47 and 48 in such positions relative to the pivotal points of the weights that the pressure exerted by these faces against the hub 45 gradually increases as the weights move outward. This increase of pressure is due to the outward shifting of the points of contact to points lying almost in horizontal lines drawn through the pivotal points of the weights, thus applying the centrifugal force of the weights to the shifting of the disks through what constitutes, in effect, a toggle.

It will be seen from the foregoing that as the weights move outward there are three features combining to apply a rapidly increasing pressure of one disk upon the other.

In the practice of my invention, the electromagnetic device 20 is preferably energized and deënergized in unison with the motor 11. This may be accomplished, for example, by including the magnet winding 23 in series with one branch of the motor winding, (the motor being of the split-phase type) as indicated diagrammatically in Fig. 1. In this view, 49 and 50 are two conductors connecting the motor and clutch device with a suitable source of current E. Conductor 49 divides, one branch 51 leading directly to one portion of the motor winding, and the other branch leading through winding 23 and conductor 52 to the other portion of the motor winding. Conductor 50 constitutes the common return from both portions of the motor winding. It will be seen therefore that the energization of the electromagnetic device 20 is in unison with the energization of the motor 11. If desired, the impedance of the winding 23 may be employed to cause or to aid in causing the necessary phase displacement in the two portions of the stator winding.

The operation of the clutch device here shown will now be readily understood. When the motor and electromagnetic device are deënergized and the motor is at rest, the parts of the device occupy the positions indicated in Fig. 1. When now operating current is supplied to the conductors 49 and 50, the motor starts to rotate, and the electromagnetic device 20 is energized, moving clutch disk 18 into its engaging position; the parts are now in the positions indicated in Fig. 2, the centrifugal device 21 being in its closed position because the rotor has not yet attained the predetermined speed at which this device opens. Clutch disk 19 is therefore not in position for engagement with disk 18, and the motor is still disconnected from its load. When the predetermined speed is reached, the weights 39 and 42 move outward, moving disk 19 into engagement with disk 18, and the motor is connected with the shaft 13 and therefore with its load, the parts then being in the positions indicated in Fig. 3. When the work to be done by the motor is accomplished, the operating current is cut off, the electromagnetic device 20 is thereby deënergized and spring 22 moves the disk 18 away from disk 19 and into engagement with the braking surfaces 53 and 54. The effect of this is to quickly arrest the momentum of the shaft and of the load, and to leave the rotor and centrifugal device rotating idly until their energy has been expended, after which these parts assume the position indicated in Fig. 1.

A clutch device embodying my invention is adapted for use in connection with numerous classes of apparatus to be driven by a motor, and I do not wish to be limited to any specific application of my invention. It is however particularly well adapted for use in connection with railway signal mechanisms; it may for example be used in connection with a signal mechanism of the type shown and described in United States Letters Patent No. 994125 granted to me on June 6, 1911.

By the use of my invention, a signal mechanism may be operated by a single phase induction motor of moderate dimensions and consuming a minimum amount of power.

My invention, also insures a practically instantaneous arrest of the signal's motion the instant the operating current is interrupted, thereby permitting a close definition of the signal's position at both the caution and clear position in case of a three-position signal, and at the clear position in case of a two-position signal, by the proper adjustment of the motor controlling contacts of the signal mechanism.

Although I have herein shown and described only one form of clutch device embodying my invention, it is understood that various modifications and changes may be made therein within the scope of the appended claims without departing from the spirit and scope of my invention.

Having thus described my invention, what I claim is—

1. In a clutch device, a rotatable driving member, two co-acting clutch members each capable of longitudinal movement relatively to the other, one of which is operatively connected with the driving member, and separate and independent means for moving each clutch member toward the other and for holding them in mutual engagement.

2. In a clutch device, a rotatable driving member and a member to be driven, two co-acting clutch members each capable of longitudinal movement relatively to the other, one of which is constrained to rotate with the driving member and the other with the member to be driven, and separate and independent means for moving each clutch member toward the other and holding them in mutual engagement.

3. In a clutch device, two coacting clutch disks each having longitudinal movement relatively to the other, a driving member operatively connected with one of said disks, a centrifugal device operated by the driving member and adapted to move the said disk toward the other disk when the driving member reaches a predetermined speed, an electromagnetic device and means interposed between said device and the other disk and controlled by said device for moving said other disk toward and permitting it to move away from the first named disk.

4. In a clutch device, two coacting clutch disks each having longitudinal movement relatively to the other, a driving member operatively connected with one of said disks, a centrifugal device operated by the driving member and adapted to move the said disk toward the other disk when the driving member reaches a predetermined speed, means for biasing the other disk to a position away from the first named disk, an electromagnetic device, and means interposed between said device and the second named disk and controlled by said device for moving the second named disk toward and for permitting it to be moved away from the first named disk.

5. In a clutch device the combination with a motor comprising a rotor, of two coacting clutch disks, one of which rotates with the rotor and has longitudinal movement relatively thereto, and the other of which is operatively connected with a load to be driven and is capable of longitudinal movement relative to the first named disk, a centrifugal device operated by the rotor and adapted to move the first named disk toward the second named disk, an electromagnetic device and means interposed between said device and the second named disk and controlled by said device for moving said disk toward and permitting it to move away from the first named disk.

6. In a clutch device, the combination of a shaft capable of longitudinal movement, a motor comprising a rotor mounted to rotate freely on the shaft, two coacting clutch disks, one of which rotates with the rotor and is capable of longitudinal movement relatively thereto, the other of which is rigidly secured to the shaft, a centrifugal device operated by the rotor and adapted to move the first named clutch disk toward the second named clutch disk when the rotor attains a predetermined speed, an electromagnetic device, and means interposed between said device and the shaft for moving said shaft and its disk toward and permitting them to move away from the first named disk according to whether or not said device is energized.

7. In a clutch device, the combination of a shaft, a motor comprising a rotor, a clutch disk constrained to rotate with the rotor and capable of longitudinal movement relatively thereto, a second clutch disk capable of longitudinal movement relatively to the first named disk, a centrifugal device operated by the rotor and adapted to move the first named clutch disk toward the second named clutch disk when the rotor attains a predetermined speed, an electromagnetic device, and means interposed between said device and the second named disk for moving said disk toward and permitting it to move away from the first named disk.

8. In a clutch device, the combination of a motor comprising a rotor, a clutch disk constrained to rotate with the rotor and capable of longitudinal movement relatively thereto, a second clutch disk capable of longitudinal movement relatively to the first named disk, a centrifugal device operated by the rotor and adapted to move the first-named disk toward the second-named disk when the rotor attains a predetermined speed, means for biasing the second-named disk to a position away from the first-named disk, and an electromagnetic device operatively connected with the second named disk for moving said disk toward the first named disk and for permitting it to be moved away therefrom.

9. In a clutch device, the combination of a motor comprising a rotor, a clutch disk constrained to rotate with the rotor and capable of longitudinal movement relatively thereto, a second clutch disk capable of longitudinal movement relatively to the first named disk, a centrifugal device operated by the rotor and adapted to move the first-named disk toward the second-named disk when the rotor attains a predetermined speed, means for biasing the second-named disk to a position away from the first-named disk, an electromagnetic device adapted to move the second-named disk toward the first-named disk and to permit it to be moved away therefrom, and braking surfaces arranged to engage the second named disk when said disk is moved away from the first named disk.

10. In a clutch device, a rotatable driving member, two coacting clutch disks one of which is constrained to rotate with the driving member but capable of longitudinal movement relatively thereto and the other of which is connected with the load to be driven, and a centrifugal device interposed between the driving member and its clutch disk and adapted to move the said clutch disk toward the other clutch disk when the driving member reaches a predetermined speed, said centrifugal device comprising a weight pivotally mounted upon the driving member and biased to lie normally close to the axis of the driving member, which weight is adapted to swing outwardly when the said predetermined speed is reached thereby increasing the radius through which the weight acts, whereby the weight when once started outwardly will continue to the limit of its outward movement without an increase in the speed of the driving member.

11. In a clutch device, a rotatable driving member, two coacting clutch disks one of which is constrained to rotation with the driving member and is capable of longitudinal movement relatively thereto, and the other of which is connected with the load to be driven; and a centrifugal device interposed between the driving member and its clutch disk and adapted to move the said clutch disk toward the other clutch disk when the driving member reaches a predetermined speed, said centrifugal device comprising two weights pivotally mounted on the driving member and biased to lie normally close to the axis of the driving member on opposite sides thereof, which weights are adapted to swing outwardly when the said predetermined speed is reached thereby increasing the radii through which the weights act, whereby the weights when once started outwardly will continue to the limit of their outward movement without increase in the speed of the driving member.

12. In a clutch device, a rotatable driving member, two coacting clutch disks one of which is constrained to rotation with the driving member and is capable of longitudinal movement relatively thereto; and a centrifugal device interposed between the driving member and its clutch disk and adapted to move the said clutch disk toward the other clutch disk when the driving member reaches a predetermined speed, said centrifugal device comprising a weight pivotally mounted upon the driving member and adapted to move outwardly when the said predetermined speed is reached, means for biasing said weight to lie normally close to the sides of the driving member which means is arranged to diminish in effect as the weight moves outwardly whereby the weight when once started outwardly will continue to the limit of its outward movement without increase of speed of the driving member.

13. In a clutch device, a rotatable driving member, two coacting clutch disks one of which is constrained to rotate with the driving member and is capable of longitudinal movement relatively thereto; and a centrifugal device interposed between the driving member and its clutch disk and adapted to move the said clutch disk toward the other clutch disk when the driving member reaches a predetermined speed, said centrifugal device comprising two weights pivotally mounted on the driving member on opposite sides thereof respectively and adapted to move outwardly when the said predetermined speed is reached, means for biasing the weights to lie normally close to the axis of the driving member which means is arranged to diminish in effect as the weights move outwardly whereby the weights when once started will continue to the limit of their outward movement without increase in speed of the driving member.

14. In a clutch device, a rotatable driving member, two coacting clutch disks one of which is constrained to rotate with the driving member and is capable of longitudinal movement relatively thereto; and a centrifugal device interposed between the driving member and its clutch disk and adapted to move the said clutch disk toward the other clutch disk when the driving member reaches a predetermined speed, said centrifugal device comprising two weights pivotally mounted on the driving member on opposite sides thereof respectively and adapted to move outwardly when the said predetermined speed is reached, a spring connecting the two weights and biasing the weights to lie normally close to the axis of the driving member, the points of connection of the spring with the weights being so located as to approach the line of the pivotal points as the weights move outwardly thereby diminishing the biasing effect of the spring upon the weights whereby the weights when once started outwardly will continue to the limit of their outward movement without increase in speed of the driving member.

15. In a clutch device, a rotatable driving member, two co-acting clutch disks one of which is constrained to rotate with the driving member and is capable of longitudinal movement relatively thereto; and a centrifugal device interposed between the driving member and its clutch disk and adapted to move the said clutch disk toward the other clutch disk when the driving member reaches a predetermined speed, said centrifugal device comprising a weight pivotally mounted upon the driving member and adapted to move outwardly when the said predetermined speed is reached, a spring connected with the weight and biasing the weight to lie normally close to the axis of the driving member, the point of connection of the spring with the weight being so located that the line of action of the spring approaches the pivotal point of the weight as the weight moves outwardly thereby diminishing its biasing effect upon the weight whereby the weight when once started outwardly will continue to move to the limit of its outward movement without increase in the speed of the driving member.

16. In a clutch device, a rotatable driving member, two co-acting clutch disks one of which is constrained to rotate with the driving member and is capable of longitudinal movement relatively thereto; and a centrifugal device interposed between the driving member and its clutch disk and adapted to move the said clutch disk toward the other clutch disk when the driving member reaches a predetermined speed, said centrifugal device comprising a weight pivotally mounted upon the driving member and adapted to move outwardly when the said predetermined speed is reached, a spring connected with the weight and biasing the weight to lie normally close to the axis of the driving member, the point of connection of the spring with the weight being so located that the line of action of the spring approaches the pivotal point of the weight as the weight moves outwardly thereby diminishing its biasing effect upon the weight more rapidly than the effect of the tension of the spring on the weight increases, whereby the weight when once started outwardly will continue to move to the limit of its outward movement with increasing force and without increase in speed of the driving member.

In testimony whereof I affix my signature in presence of two witnesses.

JOHN P. COLEMAN.

Witnesses:
P. UTUE,
D. J. McCARTHY.